United States Patent
Holmes

(10) Patent No.: US 7,544,141 B2
(45) Date of Patent: Jun. 9, 2009

(54) TRANSMISSION DEVICE WITH SELECTABLE MOTOR CONNECTIONS

(75) Inventor: Alan G. Holmes, Clarkston, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 328 days.

(21) Appl. No.: 11/458,276

(22) Filed: Jul. 18, 2006

(65) Prior Publication Data

US 2008/0039257 A1 Feb. 14, 2008

(51) Int. Cl.
F16H 3/72 (2006.01)
(52) U.S. Cl. .......................................................... 475/5
(58) Field of Classification Search ...................... 475/5; 180/65.7
See application file for complete search history.

(56) References Cited

U.S. PATENT DOCUMENTS

| | | | |
|---|---|---|---|
| 6,409,630 B1 | 6/2002 | Yu | |
| 6,551,208 B1 | 4/2003 | Holmes et al. | |
| 6,852,053 B2 | 2/2005 | Nakano et al. | |
| 7,192,373 B2 * | 3/2007 | Bucknor et al. | 475/5 |
| 7,195,573 B2 * | 3/2007 | Bezian et al. | 475/5 |
| 7,300,374 B2 * | 11/2007 | Bucknor et al. | 475/5 |
| 7,396,305 B2 * | 7/2008 | Raghavan et al. | 475/5 |
| 2005/0227803 A1 | 10/2005 | Holmes | |
| 2005/0252703 A1 | 11/2005 | Schmidt et al. | |
| 2006/0025259 A1 | 2/2006 | Klemen et al. | |
| 2007/0298923 A1 * | 12/2007 | Raghavan | 475/5 |
| 2008/0015073 A1 * | 1/2008 | Raghavan et al. | 475/5 |
| 2008/0081722 A1 * | 4/2008 | Raghavan et al. | 475/5 |
| 2008/0103002 A1 * | 5/2008 | Holmes | 475/5 |
| 2008/0194369 A1 * | 8/2008 | Boutou et al. | 475/5 |
| 2008/0200296 A1 * | 8/2008 | Holmes | 475/5 |

FOREIGN PATENT DOCUMENTS

WO    WO 03/043846 A1    11/2002

* cited by examiner

Primary Examiner—Dirk Wright

(57) ABSTRACT

A transmission device for a powertrain system comprising a compound planetary gear set having four coaxial elements and a plurality of input nodes and an output node is described. The first input node is connected to an input shaft from an engine. The second input node is connected to a shaft of a first electrical machine. A plurality of input nodes are selectively connectable to a second electrical machine. The output node of the transmission device is connected to an output shaft of the transmission.

13 Claims, 2 Drawing Sheets

TRANSMISSION DEVICE WITH SELECTABLE MOTOR CONNECTIONS

TECHNICAL FIELD

This invention pertains generally to a transmission system for a powertrain, and more specifically to a transmission selectively connected to a plurality of torque-generative devices.

BACKGROUND OF THE INVENTION

Powertrain systems which incorporate a plurality of torque-generative devices attached to a transmission device have been proposed for use as vehicle propulsion systems. The torque-generative devices typically include internal combustion engines and electrical machines powered using electrical energy storage devices, e.g. high voltage batteries. Torque outputs of the torque-generative devices are combined in the transmission device to supply motive torque to a driveline of the vehicle.

A typical electrically-variable transmission (EVT) splits mechanical power between an input shaft and an output shaft into a mechanical power path and an electrical power path by means of differential gearing. The mechanical power path may include clutches and additional gears. The electrical power path may employ two electrical power units, each of which may operate as a motor or as a generator. The EVT can be incorporated into a propulsion system for a hybrid electric vehicle using an electrical energy storage device. A typical hybrid propulsion system uses electrical energy storage devices and an internal combustion engine as power sources. The batteries are connected with the electrical drive units through an electronic control system which distributes electrical power as required. The control system also has connections with the engine and vehicle to determine operating characteristics, or operating demand, so that the electrical power units are operated properly as either a motor or a generator. When operating as a generator, the electrical power unit accepts power from either the vehicle or the engine and stores power in the battery, or provides that power to operate another electrical device or another electrical power unit on the vehicle or on the transmission.

A benefit of having an electrically-variable transmission incorporating more than one mode of operation is that each mode of operation will generally incorporate at least one mechanical point where one of the electrical power units is stationary, thereby reducing the electrical power input and providing a pure mechanical power flow path which is, of course, more efficient than a pure electrical power flow path.

There is a need to for a method and apparatus to improve torque and power efficiency of a transmission device, to effectively transmit torque from a plurality of torque-generative devices to an output of the transmission, to provide motive torque to a vehicle.

SUMMARY OF THE INVENTION

One form of powertrain system which addresses the foregoing comprises a system having a transmission with gearing which consists of one or more sun gears, one or more sets of planet pinions rotatably mounted in a planet carrier, and one or more surrounding ring gears. A planet carrier may be equipped with intermeshing pinions which mesh with gears in different planes, and may include one or two sun gears and one or two ring gears. These or other planetary gears can be used to create a compound planetary gear set with three or more coaxial elements, each which is considered a separate speed node for the transmission. The rotational speeds of these three or more coaxial elements or nodes are linear combinations of one another. Two speeds may be independently variable, while the remaining speeds are dependent thereon. Each of the other active rotating components may then be directly or operatively connected with one of these three or more nodes, so the speed of the other component is identical to or directly proportional to the speed the node.

In accordance with an aspect of the invention, the compound planetary gear set with four or more coaxial elements is implemented in a fuel/electric hybrid powertrain system by operatively connecting the transmission nodes to an internal combustion engine, first and second electrical machines, and an output to a driveline, wherein input connections with at least one of the electric machines are selectively controlled. This arrangement may result in an input-split, compound-split, or output-split operating range for the transmission, or combinations thereof.

In accordance with an embodiment of the invention, a torque transmission device is offered comprising a compound planetary gear set having six coaxial elements, including a first planetary carrier with pinions which mesh with a first sun gear and a first ring and a second planetary carrier with pinions which mesh with a second sun gear and a second ring gear, wherein the first planetary earner is directly connected to and for common rotation with the second ring gear forming a first carrier assembly member and the second planet carrier is similarly connected to the first ring gear forming a second carrier assembly member, the compound planetary gear set having three input nodes and an output node. The first input node is operatively connected to an input shaft from an internal combustion engine. The second input node is operatively connected to a first shaft connected to an electrical machine. The third input node and the output node are selectively operably connected to a second shaft connected to a second electrical machine, and the output node is operatively connected to an output shaft of the transmission.

Another aspect of the invention includes a powertrain system, comprising an internal combustion engine and first and second electrical machines each operative to transmit torque to a transmission device comprising a compound planetary gear set having four coaxial elements including a planetary carrier with intermeshing pinions which mesh with a sun gear and a ring gear in a plurality of planes, when the compound planetary gear set has a plurality of input nodes and an output node.

Another aspect of the invention includes an article of manufacture, comprising a storage medium having a computer program encoded therein effective to control operation of a powertrain system comprising an internal combustion engine and first and second electrical machines each operable to transmit torque to a transmission comprising a compound planetary gear set having four coaxial elements including a planetary carrier with intermeshing pinions which mesh with a sun gear and a ring gear in a plurality of planes, when the planetary gear set has a plurality of input nodes and an output node.

These and other aspects of the invention will become apparent to those skilled in the art upon reading aid understanding the following detailed description of the embodiments.

BRIEF DESCRIPTION OF THE DRAWINGS

The invention may take physical form in certain parts and arrangement of parts, the embodiments of which will be described in detail and illustrated in the accompanying drawings which form a part hereof, and wherein.

DETAILED DESCRIPTION OF THE PREFERRED EMBODIMENT

Figure 1:
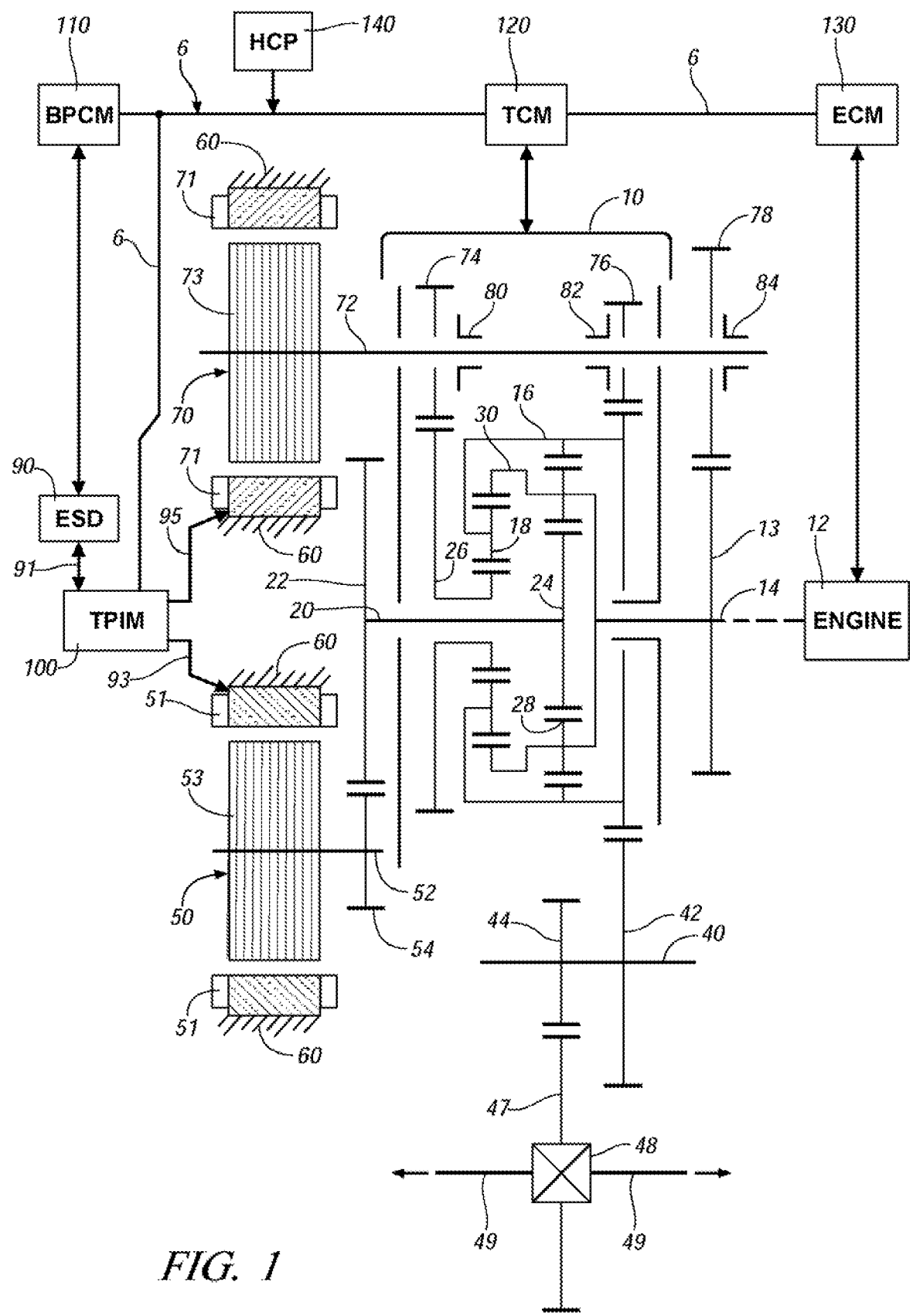
FIGS. 1 and 2 are schematic diagrams of an exemplary powertrain system, in accordance with the present invention.
Figure 2:
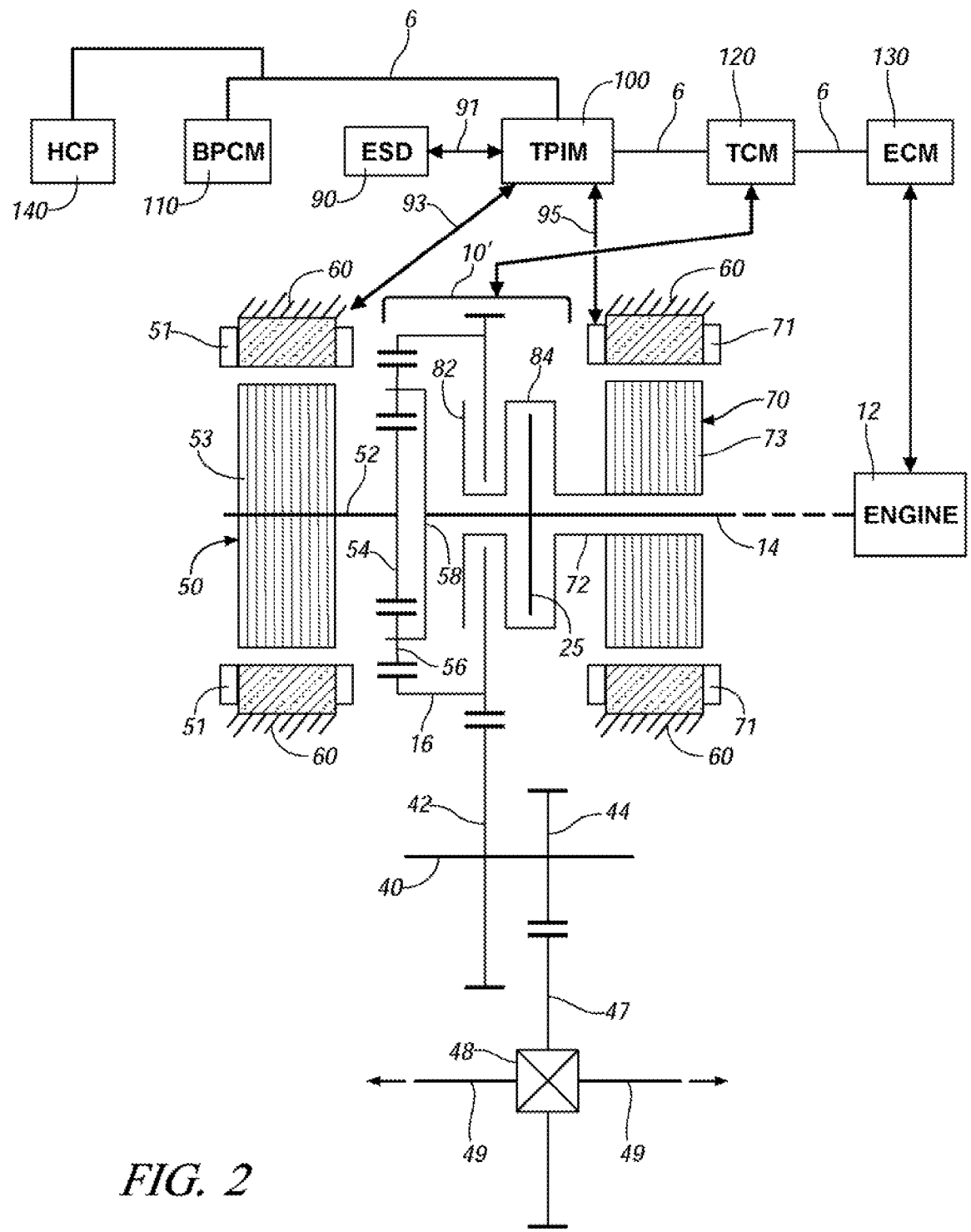

Referring now to the drawings, wherein the showings are for the purpose of illustrating the invention only and not for the purpose of limiting the same. FIGS. 1 and 2 comprise schematic depictions of embodiments of a hybrid vehicle propulsion system which have been constructed in accordance with the invention. Each embodiment includes a transmission device 10, an internal combustion engine 12, a driveline, an electrical energy storage device 90, and a distributed control system. The transmission device 10 receives input torque from torque-generative devices, including the internal combustion engine 14 and electrical machines 50, 70 as a result of energy conversion from fuel or electrical potential stored in electrical energy storage device (ESD) 90. The ESD 90 typically comprises one or more high voltage batteries. Other electrical energy storage devices that have the ability to store electric power and dispense electric power may be used in place of the batteries without altering the concepts of the present invention. The ESD 90 is preferably sized based upon factors including regenerative requirements, application issues related to typical road grade and temperature, and, propulsion requirements such as emissions, power assist aid electric range. The ESD 90 is high voltage DC-coupled to a transmission power inverter module (TPIM) 100 via DC lines, or transfer conductors, 91. The inverters of TPIM 100 comprise complementary three-phase power electronic devices operable to transmit electrical energy to and from the first electrical machine 50 by high voltage transfer conductors 93, and similarly with the second electrical machine 70 by transfer conductors 95. Electrical current is transferable to or from the ESD 90 in accordance with whether the ESD is being charged or discharged. TPIM 100 includes the pair of power inverters and respective machine controllers, and is configured to receive machine control commands and control inverter states therefrom for providing motor drive or regeneration functionality, based upon a control command from the control system. The electrical machines 50, 70 preferably comprise known three-phase AC electrical machines operable as motor and generator devices. Each electrical machine comprises a stator 51, 71 grounded to a case 60 of the transmission and a rotor device 53, 73. The rotor 53 of the first electrical machine 50 is operatively connected to a rotating shaft 52 which is operatively coupled to the transmission 10 via gear element 54. The rotor 73 of the second electrical machine 70 is operatively connected to shaft 72, which is selectively operatively coupled to the transmission 10 through actuation of one or more torque-transmitting devices, also referred to as clutches. The first and second electrical machines 50, 70 are operable to convert electrical energy to torque which is transmitted to the transmission device 10 and operable to convert torque from the transmission device 10 to electrical energy, based upon control signals and strategies executed in the control system. The internal combustion engine 12 comprises a known internal combustion engine that is operatively connected to the transmission at shaft 14. The transmission device meshingly engages gear 42 which is operatively connected to an output shaft 40. A gear member 44 is operatively attached to output shaft 40, and meshingly engages a gear member 47. Gear member 47 is operable to transmit torque to a transfer device 48, e.g. a differential, to provide output to driveshafts 49, which are preferably operatively connected to vehicle wheels or other devices operable to transmit motive torque to ground, when the system is implemented on a land vehicle.

The control system preferably comprises a distributed control module architecture interacting via a local area communications network to provide ongoing control to the powertrain system, including the engine 14, the electrical machines 50, 70, and the transmission 10. The control system is operable to gather and synthesize pertinent information and inputs, and execute algorithms to control various actuators to achieve control targets, including such parameters as fuel economy, emissions, performance, driveability, and protection of hardware. The control system preferably includes an engine control module ('ECM') 130 operable to monitor engine sensors and control engine actuators; transmission control module ('TCM') 120 operable to monitor transmission sensors aid control transmission actuators including clutches 80, 82, 84; battery pack control module ('BPCM') 110, and the Transmission Power Inverter Module ('TPIM') 100. A hybrid control module ('HCP') 140 provides overarching control and coordination of the aforementioned control modules. There is a User Interface ('UI') operably connected to a plurality of devices through which a vehicle operator typically controls or directs operation of the powertrain, including the transmission 10. Exemplary vehicle operator inputs to the UI include an accelerator pedal, a brake pedal, transmission gear selector, and, vehicle speed cruise control. Within the control system, each of the aforementioned control modules communicates with other control modules, sensors, and actuators via a local area network ('LAN') communications bus 6. The LAN bus 6 allows for structured communication of control parameters and commands between the various control modules. The specific communication protocol utilized is application-specific.

Each of the aforementioned control modules of the control system is preferably a general-purpose digital computer generally comprising a microprocessor or central processing unit; read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each control module has a set of control algorithms, comprising resident program instructions and calibrations stored in ROM and executed to provide the respective functions of each computer. Information transfer between the various control modules is preferably accomplished using the aforementioned LAN 6.

Referring specifically to FIG. 1, the transmission device 10 of this embodiment comprises a compound planetary gear set having four elements, each preferably coaxial with shaft 14. The transmission device 10 has three input nodes arid an output node through which power and torque may be transmitted. The first input node comprises carrier assembly member 30 and receives a rotational torque input from the engine 12 via input shaft 14. The second input node comprises sun gear member 24 and carries torque transmitted between the transmission and the first machine 50 through shaft 52. The third input node comprises sun gear 26 and carries torque transmitted between the transmission and the second machine 70 through shaft 72, wherein the third input nodes is effected through actuation of clutch 80. Actuation of clutch 80 operatively couples the shaft 72 to the transmission through gear 74. Actuation of clutch 82 operatively couples the shaft 72 to the transmission through gear 76. Actuation of clutch 84 operatively couples the shaft 72 to the transmission through gear 78. Selective actuation of one of clutches 80, 82, and 84 forms a power split operating mode comprising a continuously variable transmission operating range, as discussed hereinbelow. The output node comprises carrier assembly member 16 and carries torque transmitted between the transmission and an output shaft 40 which meshingly engages to the driveline.

The transmission 10 of this embodiment comprises a compound planetary carrier assembly member 30 operatively attached to shaft 14. In a first plane, a first plurality of pinion gears 28 is rotatably attached thereto. In a second plane, the planetary carrier assembly member 30 meshingly engages a second plurality of pinion gears 18. The second plurality of pinion gears 18 is rotatably connected to a second planetary carrier assembly member 16. The second plurality of pinion gears 18 also meshingly engages sun gear 26. Sun gear 26 meshingly engages gear member 74. The second planetary carrier assembly member 16 also includes a ring gear element. The ring gear element of the second planetary carrier assembly member 16 meshingly engages each of pinion gears 28, gear member 76, and gear member 42. Gear member 42 is operatively connected to output shaft 40.

In operation of the first embodiment, the second electrical machine 70 is selectively coupled to any one of gears 74, 76, and 78 through actuation of clutches 80, 82, and 84, respectively. When clutch 82 is actuated, the second electrical machine 70 is directly coupled to the output shaft 40 via shaft 72 and gear members 76, 16, and 42, thus permitting direct drive of the output shaft 40 from the second electrical machine 70, referred to as an input power split. When clutch 84 is actuated, the second electrical machine 70 is directly coupled to the engine 12 via shaft 72 and gears 78 and 13, referred to as an output power split. This permits the engine to provide direct torque input to the second electrical machine 70 to generate electrical energy, to provide electrical energy for storage, or for consumption by the first electrical machine 50. When clutch 80 is actuated, the second electrical machine 70 is directly coupled to ring gear 26 via shaft 72 and gear 74, referred to as a compound power-split.

Referring now to FIG. 2, a second embodiment of the invention is described. Common reference numerals are used to identify elements common with the first embodiment. The output shafts from engine 12 and first and second machines 50, 70 are preferably coaxial. The transmission device 10' of this embodiment comprises a planetary gear set having three elements, each preferably coaxial with shaft 14. The transmission device 10' has two input nodes and an output node through which power or torque may be transmitted. The first input node comprises planetary carrier assembly 58 and receives a rotational input from the engine 12 via input shaft 14. The second input node comprises sun gear 54 and receives torque transmitted between the transmission and the first machine 50 through shaft 52. Torque transmitted between the transmission and the second machine 70 is carried through shaft 72. Actuation of clutch 82 operatively couples the shaft 72 to the transmission through ring gear 16. Actuation of clutch 84 operatively couples the shaft 72 to the transmission through planetary carrier assembly 58. Selective actuation of one of clutches 82 and 84 forms a compound power split operating mode comprising a continuously variable transmission operating range, as discussed hereinbelow. The output node comprises torque transmitted between the transmission 10' and an output shaft 40 which meshingly engages to the driveline.

The transmission 10' of this embodiment comprises a planetary carrier assembly member 58 and member 25 each operatively attached to shaft 14. Planetary carrier assembly member 58 includes pinion gears 56. Shaft 72, output from second machine 70 engages input clutch 82 and output clutch 84. Member 25 is operative to engage output clutch 84 when it is actuated. Shaft 52, output from first machine 50, is operatively attached to gear member 54, which meshingly engages pinion gears 56, which meshingly engage ring gear 16. Ring gear 16 is mechanized to meshingly engage gear member 42 which is operatively attached to shaft 44. Ring gear 16 is further operable to engage input clutch 82 when it is actuated, thus engaging shaft 72.

In operation of the second embodiment, the second electrical machine 70 is selectively coupled to either of gears 16 and 25 through actuation of clutches 82 and 84, respectively. When clutch 82 is actuated, the second electrical machine 70 is directly coupled to the output shaft 40 via shaft 72 and gear members 16 and 42, thus permitting direct drive of the output shaft 40 from the second electrical machine 70 to provide motive torque. This is referred to as an input power split. When clutch 84 is actuated, the second electrical machine 70 is directly coupled to the engine 12 via shaft 72 and gear 25, referred to as an output power split. This permits the engine to provide direct torque input to the second electrical machine 70 to generate electrical energy, to provide electrical energy for storage, or for consumption by the first electrical machine 50.

It is understood that modifications in the transmission hardware are allowable within the scope of the invention. The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. Torque transmitting device, comprising:
   a planetary gear set having three coaxial elements, including a planetary carrier with pinions which mesh with a sun gear and a ring gear in a single plane, the planetary gear set having a plurality of input nodes and an output node;
   the first input node operatively connected to an input shaft to the transmission;
   the second input node operatively connected to a first electrical machine;
   a plurality of input nodes selectively operatively connectable to a second electrical machine; and,
   the output node operatively connected to an output shaft of the transmission.

2. The torque-transmitting device of claim 1, wherein the input nodes selectively operatively connectable to the second electrical machine further comprises the second electrical machine operatively connectable to the input shaft to the transmission by selective actuation of a first clutch.

3. The torque-transmitting device of claim 1, wherein the input nodes selectively operatively connectable to the second electrical machine comprises the second electrical machine operatively connectable to the output shaft by selective actuation of a second clutch.

4. The torque-transmitting device of claim 1, wherein the input nodes selectively operatively connectable to the second electrical machine comprises the second electrical machine selectively operatively connectable to a third input node by selective actuation of a third clutch.

5. The torque-transmitting device of claim 4, further comprising the second electrical machine selectively operatively connectable to one of the input shaft by selectively actuating a second clutch and the output shaft by selective actuation of a first clutch.

6. A powertrain system, comprising an internal combustion engine and first and second electrical machines each operable to transmit torque to a transmission device comprising a planetary gear set having three coaxial elements including a planetary carrier with pinions which mesh with a sun gear and a ring gear in a single plane, the planetary gear set having a plurality of input nodes and an output node, comprising:

the internal combustion engine operative to transmit torque to an input shaft operatively connected to the first input node;

the first electrical machine operatively connected to the second input node;

the second electrical machine selectively operatively connectable to one of the input shaft, the output shaft, and a plurality of input nodes; and, the output node operatively connected to the output shaft of the transmission.

7. The powertrain system of claim 6, wherein the second electrical machine is operatively connectable to the input shaft to the transmission by selective actuation of a first clutch.

8. The powertrain system of claim 7, further comprising the second electrical machine operative to generate electrical energy.

9. The powertrain system of claim 6, wherein the second electrical machine is operatively connectable to the output shaft by selective actuation of a second clutch.

10. The powertrain system of claim 9, further comprising the second electrical machine operative to generative motive torque.

11. The powertrain system of claim 6, wherein the second electrical machine is selectively operatively connectable to a third input node by selective actuation of a third clutch.

12. The powertrain system of claim 11, wherein the second electrical machine is selectively operatively connectable to one of the input shaft by selectively actuating a second clutch and the output shaft by selective actuation of a first clutch.

13. Article of manufacture, comprising a storage medium having a computer program encoded therein effective to control operation of a powertrain system comprising an internal combustion engine and first and second electrical machines each operable to transmit torque to a transmission comprising a planetary gear set having three coaxial elements including a planetary carrier with pinions which mesh with a sun gear and a ring gear in a single plane, the planetary gear set having a plurality of input nodes and an output node operatively connected to an output shaft of the transmission including the first node operatively connected to an input shaft of the internal combustion engine and the second node operatively connected to the first electrical machine, the program comprising:

code to selectively operatively connect the second electrical machine to one of the input shaft, the output shaft, and a plurality of input nodes of the transmission.

* * * * *